(12) United States Patent
Mifune et al.

(10) Patent No.: US 6,745,154 B2
(45) Date of Patent: Jun. 1, 2004

(54) REMOTE DIAGNOSIS METHOD AND SYSTEM, AND PORTABLE INFORMATION PROCESSOR THEREFOR

(75) Inventors: Yoshiteru Mifune, Hirakata (JP); Yoshihiko Yamada, Hirakata (JP); Yoshiyuki Shiwaku, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 134 days.

(21) Appl. No.: 09/985,929

(22) Filed: Nov. 6, 2001

(65) Prior Publication Data

US 2002/0059046 A1 May 16, 2002

(30) Foreign Application Priority Data

Nov. 14, 2000 (JP) ........................................ 2000-346098

(51) Int. Cl.[7] ................................................ G06F 11/00
(52) U.S. Cl. ....................................................... 702/188
(58) Field of Search ........................... 702/188; 379/21; 705/5; 235/382

(56) References Cited

U.S. PATENT DOCUMENTS

| | | | | | |
|---|---|---|---|---|---|
| 5,397,883 A | * | 3/1995 | Miyashita | ..................... | 235/382 |
| 5,528,660 A | * | 6/1996 | Heins et al. | ................... | 379/21 |
| 5,703,929 A | * | 12/1997 | Schillaci et al. | ............... | 379/21 |
| 2001/0018660 A1 | * | 8/2001 | Sehr | .............................. | 705/5 |

FOREIGN PATENT DOCUMENTS

JP          03-004660          1/1991

* cited by examiner

*Primary Examiner*—John Barlow
*Assistant Examiner*—Tung S Lau
(74) *Attorney, Agent, or Firm*—McDermott, Will & Emery (57) ABSTRACT

In a remote diagnosis method for diagnosing by transmitting and receiving information between a support center system and a portable information processor by way of a communication system, an inspection unit for inspecting the object of inspection is installed in a function unit housing of the portable information processor, the portable information processor transmits the inspection data collected by the inspection unit to the support center system, and the support center system returns the result of diagnosis based on the received inspection data to the portable information processor.

29 Claims, 5 Drawing Sheets

REMOTE DIAGNOSIS METHOD AND SYSTEM, AND PORTABLE INFORMATION PROCESSOR THEREFOR

BACKGROUND OF THE INVENTION

1. Field of the Invention

The present invention relates to an on-line diagnosis method and system, and a portable information processor with wireless communication unit combined an inspection unit and a center system for the on-line diagnosis system.

More particularly, it relates to a diagnosis system which an inspector is able to using a portable personal computer not only for inspecting, adjusting or repairing an object device to be inspected, but also for requesting detail inspection, ordering parts for repairing, and settling the payment, efficiently in on-line processing.

2. Description of the Related Art

In the conventional diagnosis system of electric household appliances, telephone lines, power machines and passenger cars, the inspector brings the inspection kit to the site and inspects the object device, and analyzes the data collected by inspection kit in off-line process and adjusts or repairs the inspection object devices.

In the conventional diagnosis system, the inspector must bring the inspection kit to the site, and often change unexpectedly the inspection data and a format of report at the site depending on the sort of inspection. If such an unexpected event occurs at the site, the inspector must collect the data associated with inspection, return to the office to analyze the data. After then the inspector return back to the site to continue the job.

In other known system, the inspector collects data of the inspection object device, feeds the data to the personal computer through serial interface or the like. And then analyze the data based on the inspection data preliminarily stored in the personal computer. However, if the stored inspection data is insufficient or inappropriate, or if a highly professional knowledge is required in judging the data, the inspector could not sufficiently respond to the data at the site.

On the other hand, Japanese Laid-open Patent No. 3-4660 discloses a diagnosis system, in which upon mounting a specific inspection apparatus including computer system for making diagnosis the functionality of that automobile, the inspector collects data about computer system, and transmits the data to the support center by wireless communication, so that the support center diagnoses the state of the functionality of the automobile. In this disclosed technology, the inspection apparatus including computer system is not versatile or portable, and the inspector cannot get his job instruction menu and he cannot settle the payment to the customer through this inspection apparatus.

SUMMARY OF THE INVENTION

The invention is devised in the light of the prior art.

The portable information processor of the remote diagnosis system of the invention comprises a communication unit for exchanging information with the support center system, and a function unit housing for incorporating a detachable external unit. When the external unit is an inspection unit for inspecting the inspection object, the communication unit transmits the inspection data collected by the inspection unit to the support center system, and receives the support data about the inspection object based on the diagnosis result of the transmitted inspection data from the support center system.

The support center system of the remote diagnosis system of the invention comprises a communication unit for exchanging data with the portable information processor, and an inspection data diagnosis unit for diagnosing based on the inspection data received in the communication unit. The diagnosis result of the inspection data diagnosis unit is transmitted to the portable information processor.

The support center system of the remote diagnosis system of the invention further comprises a customer's information memory recording customer's information including at least the inspection request and address of customers, an inspector's information memory recording inspector's information including at least the skill level and schedule of inspectors, and a diagnosis job instruction unit for instructing a diagnosis job to the inspector in charge based on both the customer's information recorded in the customer's information memory and the inspector's information recorded in the inspector's information memory.

DESCRIPTION OF THE PREFERRED EMBODIMENTS

According to the diagnosis system of the invention, an inspector brings a small inspection unit to various sites, and inspects objects by installing the small inspection unit. The small inspection unit attachable to a portable information processor (hereinafter called a portable personal computer) and the portable personal computer have a communication unit. The inspector transmits the inspection data collected by the small inspection unit to the host computer in the office of support center through the communication unit of the portable personal computer. The host computer in the office diagnoses the device or the state of internal communication line based on the collected inspection data and inspection reference data stored in the host computer. The host computer transmits the result of diagnosis, and information necessary for maintenance, checking, adjustment or repair to the portable personal computer at the site of inspection by on-line process. As a result, the inspector can react promptly at the site. This system may be developed so that a further advanced service may be presented.

That is, according to the inspection request or reserved periodic diagnosis schedule, the host computer of the support center sends necessary information to the portable personal computer connected to the host computer by wireless or wired network. The host computer instructs an inspector available in schedule and close to the customer to inspect the object by sending the way to the customer's place, item of inspection, inspection unit to be used, adjustment specification, and parts to be replaced. Thus, the inspector can rush to the customer to satisfy the request adequately.

If the inspection at the site can be done sufficiently only with the inspection data stored in the portable personal computer, the inspector can inspect alone with the portable personal computer and the inspection unit only. If insufficient, the inspector installs the wireless communication unit or Internet circuit in the portable personal computer, and receives supports from the support center while communicating with the host computer. The inspector can receive the additional inspection data from the host computer, and inspects again. Further, the inspector transmits the raw data collected to the host computer, and can request diagnosis by the diagnosis program. The inspector also may convert the raw data collected into a format easy to analyze in the portable personal computer, and transmit the processed data to the computer of the professional person in charge to request analysis. Thus, the inspector can inspect adequately and promptly at the customer site depending on the status of the inspection object.

As a result of inspection, if maintenance parts are needed, the stock and their delivery term of maintenance parts can be checked from the portable personal computer through the host computer and network. The host computer orders maintenance parts and specifies the destination and date of shipping of the parts, and immediately returns the result to the portable personal computer at the site. Thus, the inspector at the site can immediately inform the customer of the delivery period of parts, completion date of maintenance or repair, and expenses.

Moreover, if the inspector replaces the inspection unit with a credit information reader, the payment can be settled on the spot by the customer's credit card, prepaid card, IC card, various member card or cash card, as well as a new customer's information can be also registered at the site.

Embodiments of the invention are explained below by referring to the accompanying drawings.

Figure 1:
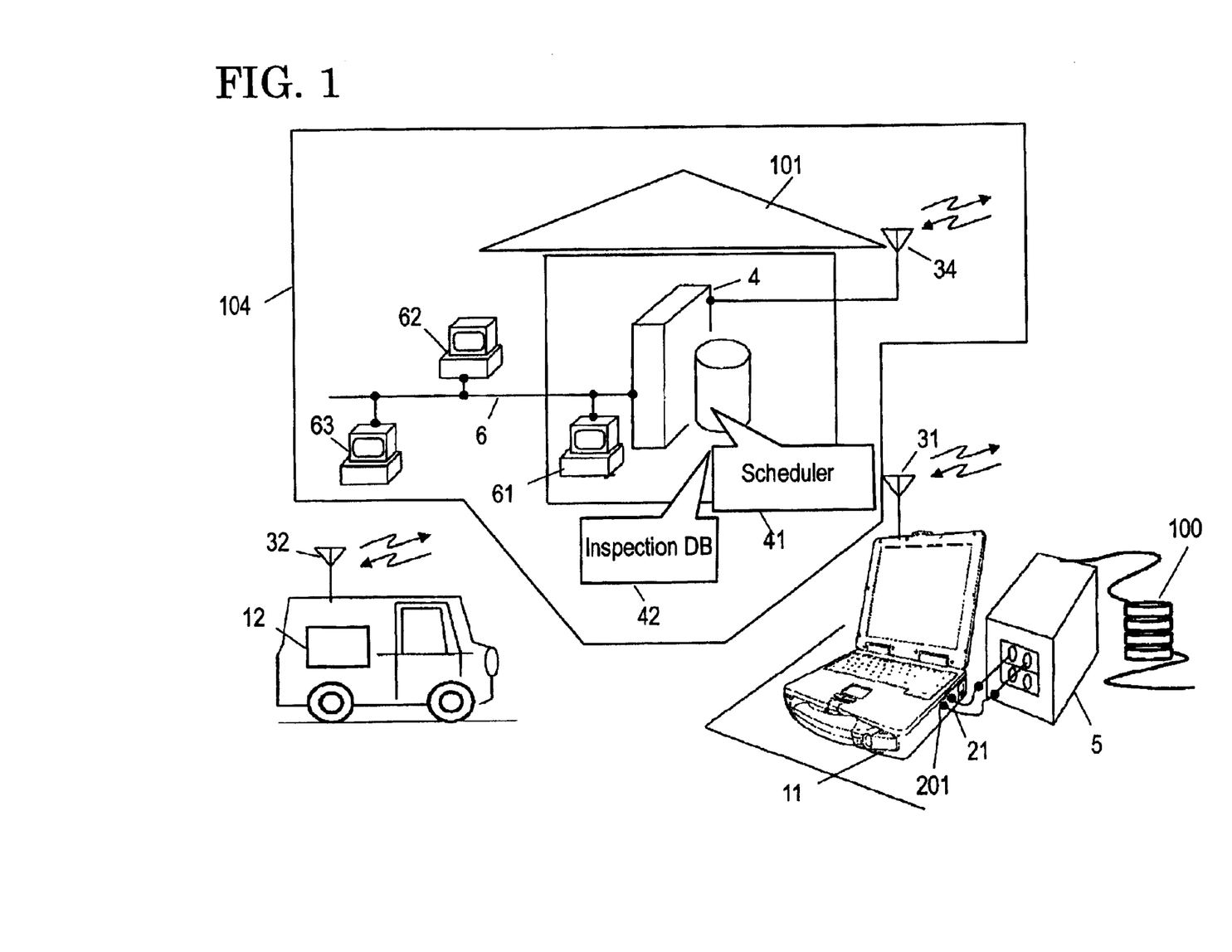
FIG. 1 is a system block diagram of an embodiment of remote diagnosis system of the invention.

FIG. 1 is a system block diagram of an embodiment of remote diagnosis system of the invention.

The remote diagnosis system in FIG. 1 comprises a portable personal computer 11, which may be a personal digital assistants or generally designated as portable information processor, a support center system 104 in an office 101 remote from the position of the portable personal computer 11, a communication system for exchanging information between a wireless communication unit 31 of the portable personal computer 11 and a wireless communication unit 34 of the support center system 104, a function unit housing 201 provided in the portable personal computer 11, and an inspection unit 21 attached in the function unit housing 201 for inspecting a communication line exchange unit 5 which is the object of inspection in this case. The wireless communication unit 31 may be either detachably installed in the portable personal computer 11, or built in the portable personal computer 11. The wireless communication unit 31 transmits the inspection data collected by the inspection unit 21 at the customer side to the support center system 104. Upon receiving the inspection data, the support center system 104 transmits a set of diagnosis result and support data to the portable personal computer 11 of customer site. The portable personal computer 11 receives the set of diagnosis result and support data for maintenance and repair of the inspection objects which are the communication line exchange unit 5 and communication line 100 in this case.

The support center system 104 in the office 101 comprises wireless communication unit 34 for making wireless communications with portable personal computer 11, a host computer 4 for diagnosing the object based on the inspection data received by the wireless communication unit 34, an inspection database 42 composed of inspecting software and inspection data received in the wireless communication unit 34 and other data necessary for diagnosis, and a scheduler 41 for instructing a diagnosis job.

The scheduler 41 is a scheduler as a program on the host computer 4, and is responsible for such overall scheduling as management of inspection database 42, off-line diagnosis job support, and on-line diagnosis job support through the wireless communication unit 34.

In this embodiment, wireless communication is used between the portable personal computer 11 and the host computer 4, but a similar remote diagnosis system can be also realized by wired or wireless communication by the electronic mail or Internet in the information exchange between the portable personal computer 11 and host computer 4.

In the office 101, the host computer 4 is connected to personal computers 61 to 63 through the network 6. The host computer 4 issues the diagnosis job instructions also to these personal computers 61, 62, and 63, and according to the instructions, professional inspectors support the diagnosis jobs in real time through the respective personal computers 61, 62, and 63. The host computer 4 can also fetch the professional inspectors acting outside the office 101 or other inspectors highly specialized in a specific field by the communication systems 34 and 32, and acquire support from the portable personal computer 12.

Figure 2:
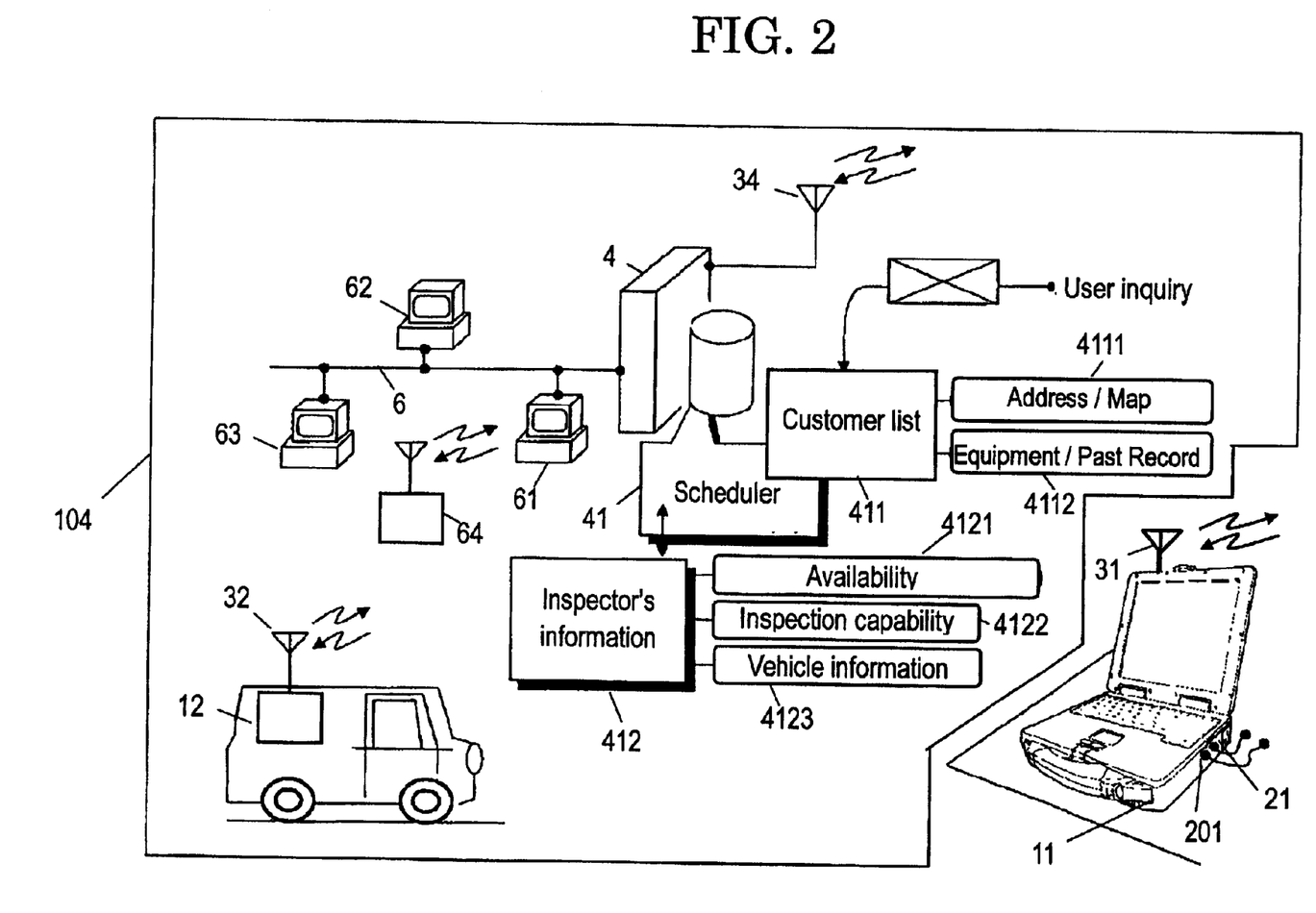
FIG. 2 is an explanatory diagram about job instruction of diagnosis job of the remote diagnosis system in the embodiment in FIG. 1.

FIG. 2 is an explanatory diagram about job instruction of diagnosis job of the remote diagnosis system in the embodiment in FIG. 1.

In FIG. 2, the same reference numerals as in FIG. 1 are not explained again. In the support center system 104 in FIG. 2, a customer list 411 records customer information, and is linked with the host computer 4 to identify the customers, and register the information of new customers when inquired from new customers. The customer list 411 also includes an address and map information 4111 recording the address of customers and map thereof, and an equipment and inspection information 4112 recording the facility of customers and past inspection information. The host computer 4 identifies the customer, and registers the schedule of periodic diagnosis for the customer acquired from the equipment and inspection information 4112 in the scheduler 41.

Inspector's information 412 records identification of inspectors engaged in inspection and diagnosis, as well as technical level and specialized field of inspectors. The inspector's information 412 includes an available status 4121 showing the availability of a specific inspector at a certain time in inspection or diagnosis, an inspection capability information 4122 recorded the capable sort of inspection and capable level of inspection of each inspector, and a vehicle information 4123 recorded information about inspection car of inspector and inspection tools therewith. Referring to the customer list 411 and the inspector's information, the host computer 4 selects an available inspector having suitably qualified technical level, and then instructs the job bases on the inspection capability information 4122.

In case of an emergency request from a customer, the host computer 4 can also instruct the emergency job to a professional inspector waiting at the personal computer 61, 62, or 63 connected to the network 6 in the support center system 104.

Similarly, the support center system 104 can also give a job instruction to other inspector or professional inspector carrying a portable personal computer 12 through communication means 34 and 32.

Figure 3:
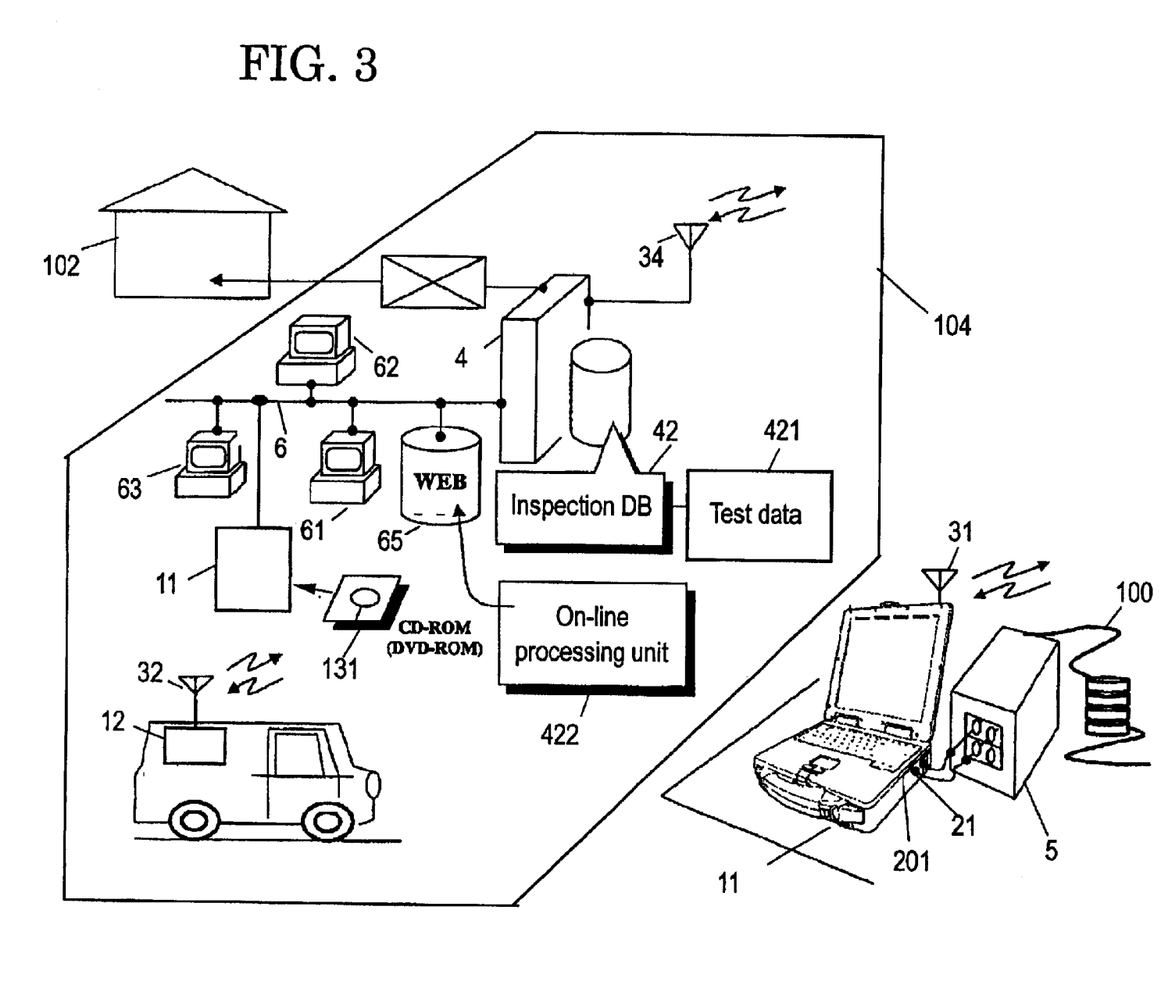
FIG. 3 is an explanatory diagram of on-line diagnosis and on-line inspection data support of the remote diagnosis system in the embodiment in FIG. 1.

FIG. 3 is an explanatory diagram of on-line diagnosis and on-line inspection data support of the remote diagnosis system in the embodiment of the invention. In FIG. 3, the same reference numerals as in FIG. 1 and FIG. 2 are not explained again.

In the support center system 104 in FIG. 3, a CD-ROM (or DVDROM) 131 records inspection data necessary for inspection. Instead of the CD-ROM (or DVD-ROM) 131, HDD, CD-R, CD-RW, CD-RAM, DVD-RAM, and other recording media can be used. The latest test data 421 is recorded in an inspection database 42.

The inspector preliminarily installs the CD-ROM 131 in the portable personal computer 11, and, if necessary, can download the latest test data 421 in the portable personal computer 11 through the network 6. The inspector brings this portable personal computer 11 to the site of inspection. Thus, at the site, the inspector may connect the inspection unit 21 with the line exchange unit 5 to be inspected, and can finish the diagnosis alone only by using the portable personal computer 11 without communicating with the host computer 4 through the wireless communication unit 31.

However, as a result of diagnosis of the line exchange unit 5, the inspector may not find the cause due to abnormality in frequency characteristic or the like, or the inspector may need maintenance parts. In such case, the inspector connects the portable personal computer 11 to the host computer 4 by way of the wireless communication unit 31 to request on-line diagnosis for analysis. The inspector can also order maintenance parts to a parts center 102 through the support center 104.

When on-line diagnosis is requested in the office 101, an on-line processing unit 422 writes the transmitted data on a web disk 65 on the network 6. Professional inspectors waiting at the personal computers 61, 62, and 63 perform on-line diagnosis by analyzing the data written in the web disk 65.

Figure 4:
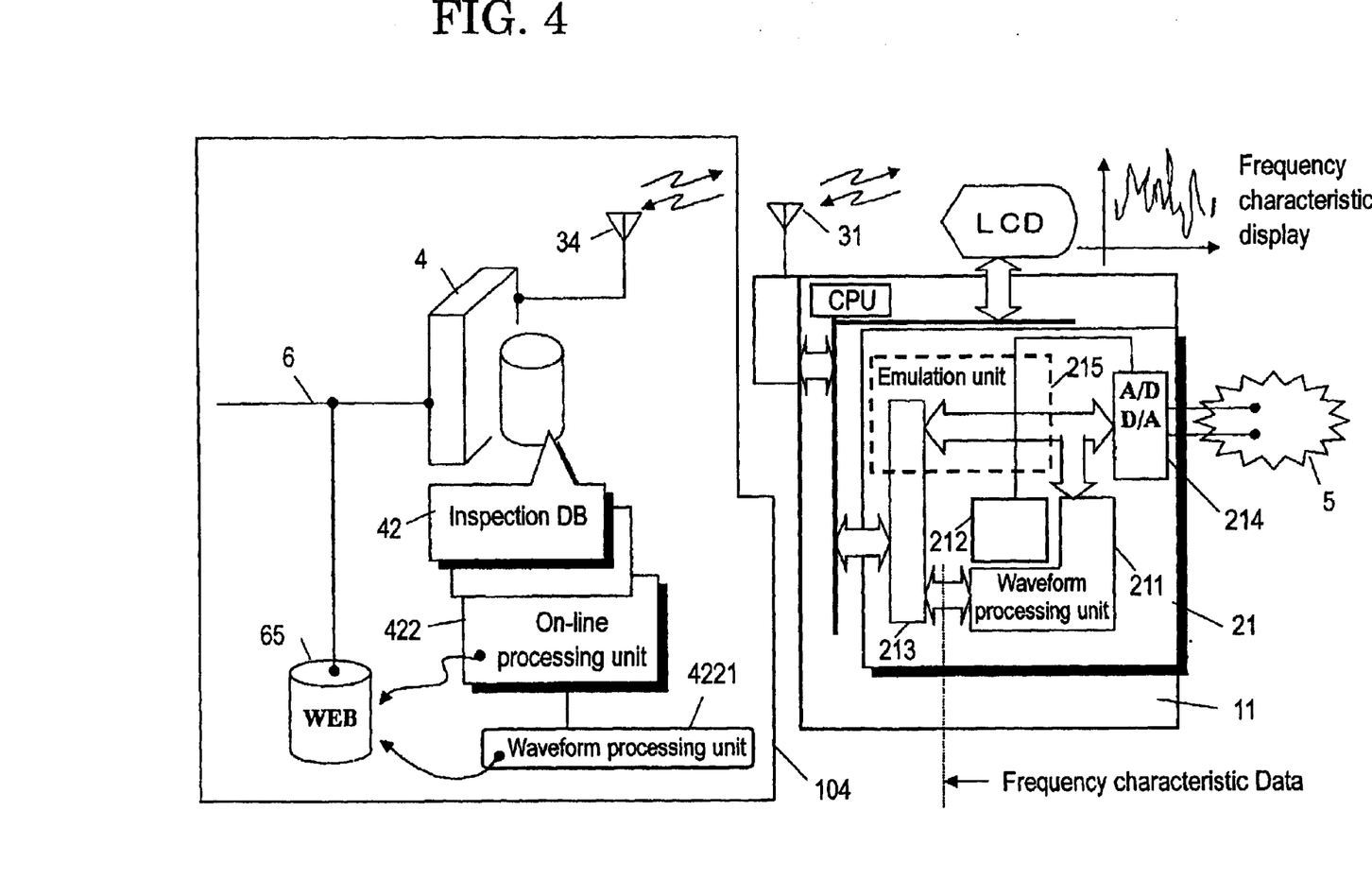
FIG. 4 is an explanatory diagram of emulation processing in other embodiment of the invention.

FIG. 4 is an explanatory diagram of emulation processing in the invention. In FIG. 4, the same reference numerals as in FIG. 1, FIG. 2, and FIG. 3 are not explained again.

In FIG. 4, the communication line exchange unit 5 is the object of inspection, and it is connected to an inspection unit 21 of a portable personal computer 11 having an emulation input mode. The inspection unit 21 comprises a waveform processing unit 211 for analyzing the waveform, an A/D and D/A converter 214 for converting input and output data of the line exchange unit 5, a buffer 213 for storing the data from the waveform processing unit 211 and the A/D and D/A converter 214, a timing unit 212 for controlling the operation timing of the waveform processing unit 211, the A/D and D/A converter 214 and buffer unit 213, and an emulation unit 215 for expanding the function so that the host computer 4 can exchange data directly with the A/D-D/A converter 214 through the buffer 213. Thus, the host computer 4 make the portable personal computer 11 at the site transmit the raw inspection data from the inspection unit 21 to the host computer 4.

Generally, the waveform processing unit 211 processes inspection data into frequency characteristic data or the like. The wireless communication unit 31 transmits the frequency characteristic data to the host computer 4. The on-line processing unit 422 of the host computer 4 stores the transmitted frequency characteristic data in the web disk 65. The professional inspector at one of the personal computer 61 to 63 downloads the frequency characteristic data stored in the web disk 65 through the network 6, so as to makes on-line diagnosis.

At this time, the professional inspector may require not only the frequency characteristic data acquired, but also the past inspection data or the raw inspection data before processing into frequency characteristic data for making diagnosis.

In this case, the professional inspector in the office 101 request to the portable personal computer 11 at the site through the host computer 4, to transmit the raw inspection data from the inspection unit 21. As a result, the emulation unit 215 in portable personal computer 11 at the site transmits the data of the A/D and D/A converter 214 directly to the host computer 4 through the buffer unit 213. Thus, each professional inspector using the respective personal computer 61 to 63 in the office 101 can exchange inspection data directly with the line exchange unit 5 at the site. By providing the on-line processing unit 422 of the host computer 4 with the waveform processing unit 4221 for processing inspection data into frequency characteristic data, the professional inspector can make more detailed, precise and specific on-line diagnosis in the office 101 than at the site, by using both the raw inspection data directly fetched from the site of inspection and the processed frequency characteristic data.

In the remote diagnosis system explained in FIG. 1, FIG. 2, FIG. 3, and FIG. 4, the inspection object is the communication line exchange unit 5. However the remote diagnosis system of the invention may be also applied to other such inspection objects as electric household appliance, mobile electronic appliances, power device, and other electric and electronic products. The procedure in such applications is same as in the foregoing embodiments, and the explanation is omitted.

Figure 5:
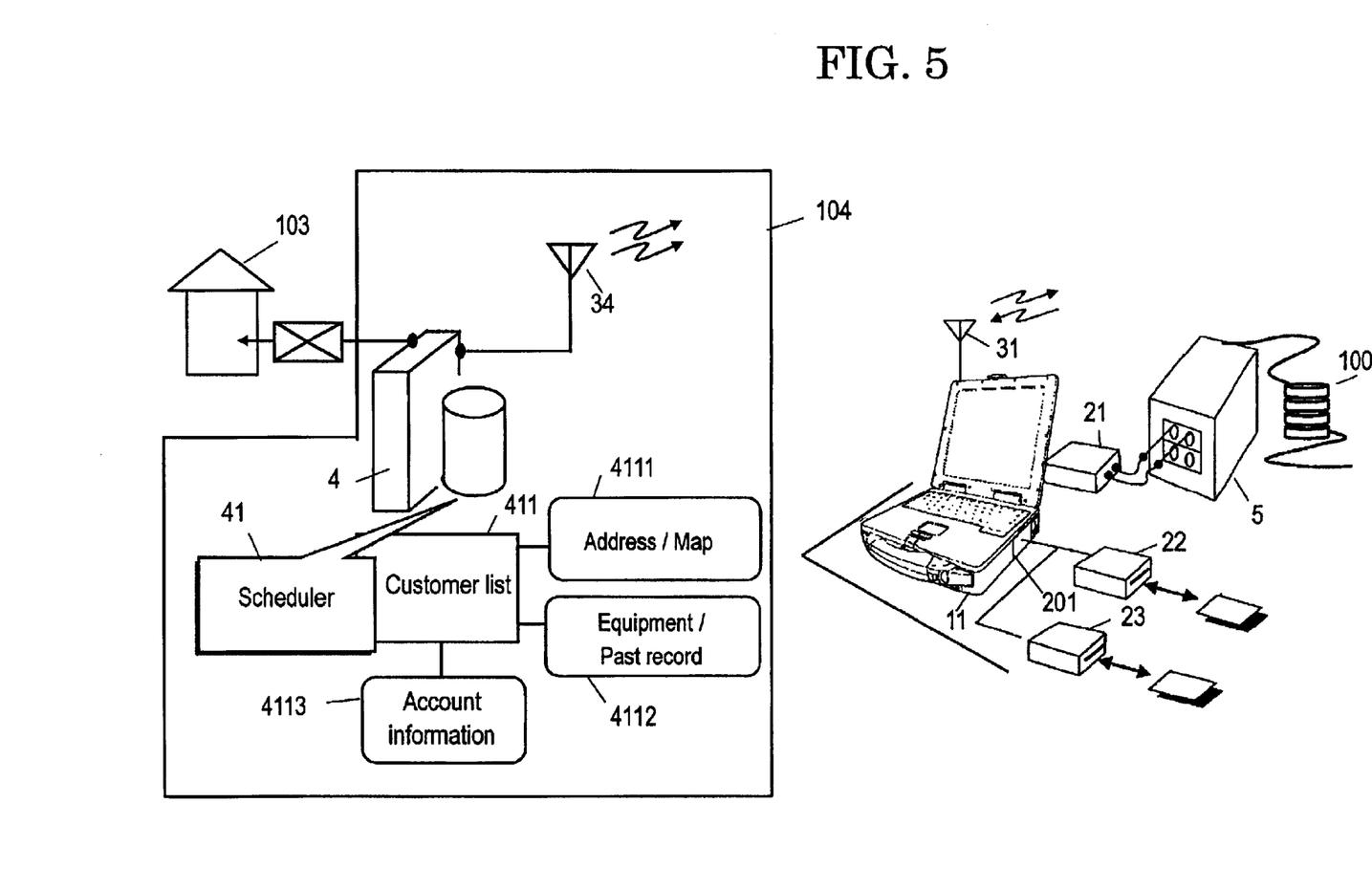
FIG. 5 is an explanatory diagram of customer payment settlement process at the site of inspection in a different embodiment of the invention.

FIG. 5 is an explanatory diagram of customer payment settlement process at the site of inspection. In FIG. 5, the same reference numerals as in FIG. 1, FIG. 2, FIG. 3, and FIG. 4 are not explained again.

In FIG. 5, when the inspection is finished, upon removing the inspection unit 21 from the function unit housing 201 of the portable personal computer 11, the inspector at the site connects a credit card reading unit 22, or smart card reading and writing unit 23 into the function unit housing.

Thus, the customer credit information is read out at the site of inspection, and then is transmitted to the host computer 4 through the wireless communication unit 31, so that the host computer 4 communicates with a financial institute 103, and settles payment of expenses for inspection and/or repair.

In the case of a new customer, the customer information is newly registered in the customer list 411. The credit information of new customer is written in an account information memory 4113 of the customer list 411. The address and map information of the new customer is stored in the address and map information memory 4111. The equipment and inspection record information of the new customer is written in the equipment and past record memory 4112.

In this settlement system, as for the existing customer using the smart card, the data in the account information 4113 is updated and the smart card itself is also updated through the wireless communication units 34 and 31.

The payment settlement of the customer is not limited to the credit card and smart card only. The settlement is possible in the same manner as in the embodiment by using such other means as prepaid card, cash card, member card, or Internet settlement by the personal computer of the customer. In such a case, instead of the credit card reading unit 22 or smart card reading and writing unit 23, other corresponding reading unit, reading and writing unit, or connection unit may be prepared.

As described herein, the inspector at the site sends the inspection data collected by the portable information processor such as portable personal computer 11 to the office 101 of the support center 104. And the inspector at the site receives the support data corresponding to maintenance or repair of the object of inspection from the support center 104 on the basis of the result of diagnosis process there. Therefore, using only with the inspection unit 21 and portable personal computer 11 brought to the site, the inspector can inspect, adjust and repair the inspection object completely. In the insufficient case, upon receiving an advanced support of professional inspector on-line from the office 101 of the support center 104, the inspector can make customer service quickly at the site, so that the inspector can satisfy the customer always with quick and sure service by on-line support from the professional inspector stationed in the office 101.

If real-time inspection is necessary, according to the request of the professional inspector in the office 101 of the support center 104, the inspection data can be directly detected in real time from the site of inspection, and analyzed and diagnosed, so that the precision of inspection can be enhanced.

From the office 101 of the support center 104, job instruction can be sent to appropriate professional inspector or moving inspector inside and outside of the office.

The inspector can obtain inspection data by installing the inspection unit 21 exclusive for the object of inspection in the function unit housing 201, so that the inspector can always act appropriately.

While the structure of the entire system is, versatile inspection jobs can be executed efficiently. In other words, the inspector only carries small inspection units corresponding to plural objects of inspection, and installs them selectively in the function unit housing 201 to inspect, so that the inspector can always cope with a wide scope of objects of inspection. Therefore, any inspector can support plural customers efficiently. As a result, it contributes for any inspector to get customer's trust and to do enhanced reliable service.

As the portable personal computer 11, that is portable information processor, can handle the raw inspection data collected by the inspection unit 21 and the analysis data analyzed by the inspection unit 21 through high speed data bus channel, so that the inspection data can be transmitted at high speed to the host computer 4 at the support center. Therefore, the inspector at the site can be supported promptly from the host computer 4 or professional inspector at the support center.

The remote diagnosis system and method of the invention can present adequate service to customers by giving diagnosis job instructions to the inspector in charge, based on such customer's information as inspection request, address of customers, and such inspector' information as the inspector's skill level and schedule.

According to the remote diagnosis system of the invention, since the system in the office 101 of the support center 104 orders shipping of parts based on the diagnosis result, so that quick service is possible, and that the customer satisfaction can be enhanced.

The remote diagnosis system of the invention is also designed to read the customer credit information at the site, and the customer's troublesome payment of the charge can be lessened, and the fund can be recovered smoothly.

The remote diagnosis system of the invention settles payment procedure with the financial institute based on the settlement information received in the office 101, so that the accounting job in the office 101 can be rationalized.

Further, the remote diagnosis system of the invention transmits and receives related information by wireless means between the host computer 4 in the office 101 of the support center 104 and the portable personal computer 11 used as the portable information processor, so that the inspector can quickly move to the place of the customer.

In the remote diagnosis system of the invention, since the credit information of the customer can be transmitted and received by wired or wireless means in the Internet through the personal computer of the customer, the support center 104 is able to process payment of the customer by the Internet, so that the scope of customers service may be expanded.

The portable personal computer 11 used as portable information processor of the invention has the function unit housing 201 for mounting the inspection unit 21, and therefore the inspector may just carry only one portable personal computer 11 and plural small inspection units 21, so that the inspector can make inspection, repairs and maintenance to various devices of multiple during one business trip.

As described above, the remote diagnosis system of the invention has many benefits. By the remote diagnosis system of the invention, the inspector can collect data, diagnose, order parts, and settle payment promptly all at the site. In other words, versatile diagnosis job can be execute efficiently by the remote diagnosis system or method of the present invention having a simple configuration in the entire system.

What is claimed is:

1. A portable information processor of remote diagnosis system for diagnosing by exchanging information with a support center system through a communication system comprising:

a communication unit for exchanging information with the support center system, and a function unit housing for incorporating a detachable external unit, wherein when the external unit is an inspection unit for inspecting the inspection object, the communication unit transmits at least one of the inspection data collected by the inspection unit and the analysis data obtained by analyzing the inspection data to the support center system, and receives the diagnosis result based on at least the inspection data and analysis data from the support center system, wherein the function unit housing is provided with a reading device for reading a customer's credit information from any one of customer's credit card,
customer's prepaid card,
customer's cash card,
customer's member card, and
customer's Internet settlement information, the payment settlement information based on the customer's credit information is transmitted to the support center system by the communication unit.

2. A portable information processor of remote diagnosis system for diagnosing by exchanging information with a support center system through a communication system comprising:

a communication unit for exchanging information with the support center system, and a function unit housing for incorporating a detachable external unit, wherein when the external unit is an inspection unit for inspecting the inspection object, the communication unit transmits at least one of the inspection data collected by the inspection unit and the analysis data obtained by analyzing the inspection data to the support center system, and receives the diagnosis result based on at least the inspection data and analysis data from the support center system, wherein the communication unit transmits and receives information to and from the support center system by Internet line.

3. The portable information processor of claim 1 or 2, wherein the communication unit receives the data for inspecting the inspection object by the inspection unit from the support center system.

4. The portable information processor of claim 1 or 2, wherein the inspection unit is a unit different in each object of inspection.

5. The portable information processor of claim 1 or 2, wherein the inspection unit is a unit corresponding to plural objects of inspection.

6. The portable information processor of claim 1 or 2, further comprising:

an input unit for receiving inspection data and analysis data from the inspection unit.

7. The portable information processor of claim 1 or 2, wherein the communication unit transmits and receives information to and from the support center system by wireless means.

8. A support center system of remote diagnosis system for diagnosing by exchanging information with a portable information processor through a communication system comprising:

a communication unit for exchanging data with the portable information processor, an inspection data diagnosis unit for diagnosing based on at least one of inspection data and analysis data received in the communication unit, an inspector's information memory recording inspector's information including at least the skill level and schedule of inspectors, and a diagnosis job instruction unit for issuing a diagnosis job instruction to the inspector in charge based on the inspector's information recorded in the inspector's information memory, wherein the diagnosis result of the inspection data diagnosis unit is returned to the portable information processor.

9. A support center system of remote diagnosis system for diagnosing by exchanging information with a portable information processor through a communication system comprising:

a communication unit for exchanging data with the portable information processor, an inspection data diagnosis unit for diagnosing based on at least one of inspection data and analysis data received in the communication unit, a customer's information memory recording customer's information including at least the inspection request and address of customers, and a diagnosis job instruction unit for issuing a diagnosis job instruction to the inspector in charge based on the customer's information recorded in the customer's information memory, wherein the diagnosis result of the inspection data diagnosis unit is returned to the portable information processor.

10. A support center system of remote diagnosis system for diagnosing by exchanging information with a portable information processor through a communication system comprising:

a communication unit for exchanging data with the portable information processor, an inspection data diagnosis unit for diagnosing based on at least one of inspection data and analysis data received in the communication unit, a customer's information memory recording customer's information including at least the inspection request and address of customers, an inspector's information memory recording inspector's information including at least the skill level and schedule of inspectors, and a diagnosis job instruction unit for issuing a diagnosis job instruction to the inspector in charge based on the customer's information recorded in the customer's information memory and the inspector's information recorded in the inspector's information memory, wherein the diagnosis result of the inspection data diagnosis unit is returned to the portable information processor.

11. The support center system of remote diagnosis system of claim 8, 9 or 10, wherein the communication unit transmits the data for inspecting the object to the portable information processor.

12. The support center system of remote diagnosis system of claim 8, 9 or 10, further comprising:

a repairing parts ordering unit for ordering shipment of repairing parts based on the diagnosis result of the inspection data diagnosis unit.

13. The support center system of remote diagnosis system of claim 8, 9 or 10, further comprising:

a payment settling unit for settling the payment in concern with a financial institution based on the charge settlement information sent from the portable information processor.

14. A remote diagnosis method for diagnosing by exchanging information between a support center system and a portable information processor through a communication system comprising the steps of:

installing an inspection unit for inspecting an object in a function unit housing of the portable information processor, transmitting at least one of the inspection data collected by the inspection unit and the analysis data obtained by analyzing the inspection data from the portable information processor to the support center system, returning the diagnosis result based on at least one of the inspection data and analysis data, from the support center system to the portable information processor, installing a reading device in the function unit housing of the portable information processor, reading the customer credit information of the reading device, transmitting the charge settlement information to the support center system based on the customer credit information being read, and claiming the charge of the corresponding service to the customer based on the received customer credit information by the support center.

15. A remote diagnosis method for diagnosing by exchanging information between a support center system and a portable information processor through a communication system comprising the steps of:

installing an inspection unit for inspecting an object in a function unit housing of the portable information processor, transmitting at least one of the inspection data collected by the inspection unit and the analysis data obtained by analyzing the inspection data from the portable information processor to the support center system, and returning the diagnosis result based on at least one of the inspection data and analysis data, from the support center system to the portable information processor, wherein the communication system is an Internet line.

16. The remote diagnosis method of claim 14 or 15, further comprising a step of:

transmitting the data for inspecting the object of inspection to the portable information processor.

17. The remote diagnosis method of claim 14 or 15, wherein the inspection unit is a unit different in each object of inspection.

18. The remote diagnosis method of claim 14 or 15, wherein the inspection unit is a unit corresponding to plural objects of inspection.

19. The remote diagnosis method of claim 14 or 15, wherein the communication system is a wireless communication system.

20. A diagnosis method of support center system for remote diagnosis by exchanging information with a portable information processor through a communication system comprising the steps of:

diagnosing based on at least one of the inspection data and analysis data received from the portable information processor, returning the result of diagnosis to the portable information processor, recording inspector's information including at least the skill level and schedule of inspectors, and issuing a diagnosis job instruction to the inspector in charge based on the recorded inspector's information.

21. A diagnosis method of support center system for remote diagnosis by exchanging information with a portable information processor through a communication system comprising the steps of:

diagnosing based on at least one of the inspection data and analysis data received from the portable information processor, returning the result of diagnosis to the portable information processor, recording customer's information including at least the inspection request and address of customers, and issuing a diagnosis job instruction to the inspector in charge based on the recorded customer's information.

22. A diagnosis method of support center system for remote diagnosis by exchanging information with a portable information processor through a communication system comprising the steps of:

diagnosing based on at least one of the inspection data and analysis data received from the portable information processor, returning the result of diagnosis to the portable information processor, recording customer's information including at least the inspection request and address of customers, recording inspector's information including at least the skill level and schedule of inspectors, diagnosing based on the inspection data received from the portable information processor, and issuing a diagnosis job instruction to the inspector in charge based on the customer's information, the inspector's information, and the result of diagnosis.

23. The diagnosis method of support center system of claim 20, 21 or 22, further comprising a step of:

transmitting the data for inspecting the object of inspection to the portable information processor.

24. The diagnosis method of support center system of claim 20, 21 or 22, further comprising the steps of:

ordering repairing parts based on the result of diagnosis, transmitting the results of ordering repairing parts to the portable information processor, and informing the inspector of the date of delivery of repairing parts.

25. The diagnosis method of support center system of claim 20, 21 or 22, further comprising a step of:

settling the payment in concern with a financial institution based on the charge settlement information received from the portable information processor.

26. A support center system of remote diagnosis system for diagnosing by exchanging information with a portable information processor through a communication system comprising:

a communication unit for exchanging data with the portable information processor, an inspection data diagnosis unit for diagnosing based on at least one of inspection data and analysis data received in the communication unit, and a repairing parts ordering unit for ordering shipment of repairing parts based on the diagnosis result of the inspection data diagnosis unit, wherein the diagnosis result of the inspection data diagnosis unit is returned to the portable information processor.

27. A support center system of remote diagnosis system for diagnosing by exchanging information with a portable information processor through a communication system comprising:

a communication unit for exchanging data with the portable information processor, an inspection data diagnosis unit for diagnosing based on at least one of inspection data and analysis data received in the communication unit, and a payment settling unit for settling the payment in concern with a financial institution based on the charge settlement information sent from the portable information processor, wherein the diagnosis result of the inspection data diagnosis unit is returned to the portable information processor.

28. A diagnosis method of support center system for remote diagnosis by exchanging information with a portable information processor through a communication system comprising the steps of:

diagnosing based on at least one of the inspection data and analysis data received from the portable information processor, returning the result of diagnosis to the portable information processor, ordering repairing parts based on the result of diagnosis, transmitting the results of ordering repairing parts to the portable information processor, and informing the inspector of the date of delivery of repairing parts.

29. A diagnosis method of support center system for remote diagnosis by exchanging information with a portable information processor through a communication system comprising the steps of:

diagnosing based on at least one of the inspection data and analysis data received from the portable information processor, returning the result of diagnosis to the portable information processor, and settling the payment in concern with a financial institution based on the charge settlement information received from the portable information processor.

* * * * *